United States Patent [19]
Burch et al.

[11] 3,793,525
[45] Feb. 19, 1974

[54] DUAL CELL NON-DISPERSIVE GAS ANALYZER

[75] Inventors: Darrell E. Burch; David A. Gryvnak, both of Orange City; John D. Pembrook, Costa Mesa, all of Calif.

[73] Assignee: Philco-Ford Corporation, Blue Bell, Pa.

[22] Filed: Jan. 2, 1973

[21] Appl. No.: 320,137

[52] U.S. Cl.............. 250/343, 250/351, 250/510
[51] Int. Cl. ........................................... G01n 21/34
[58] Field of Search ... 250/340, 341, 343, 344, 345, 250/346, 350, 351, 510

[56] References Cited
UNITED STATES PATENTS
3,488,491   1/1970   Schuman ........................ 250/345
3,588,496   6/1971   Snowman ........................ 250/343

Primary Examiner—William F. Lindquist
Attorney, Agent, or Firm—Gail W. Woodward; Robert D. Sanborn

[57] ABSTRACT

In a gas analyzer a beam of radiant energy, chopped at a suitable frequency, and limited by filter means to a suitable portion of the spectrum, is passed through a sample region containing an unknown quantity of gas to be analyzed. Selector cells are alternately inserted into the beam at a rate substantially lower than the chopping frequency. One selector cell contains a quantity of the gas species to be analyzed at high pressure and the other contains a quantity of the same gas at low pressure. A photo detector converts the radiant energy variations to electrical signals which can be analyzed to indicate the quantity of gas in the sample region.

5 Claims, 6 Drawing Figures

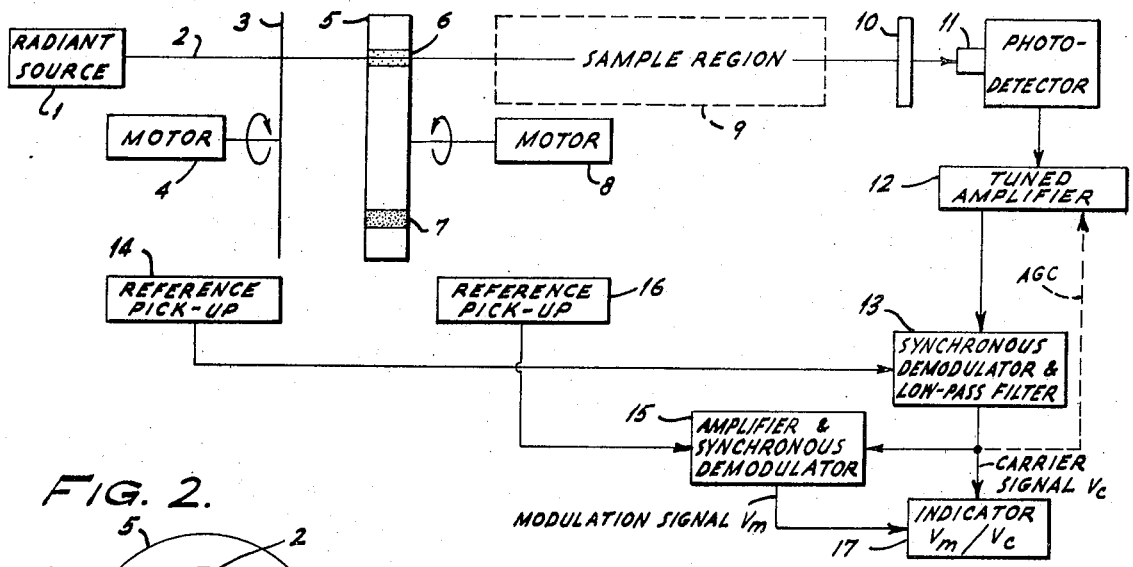
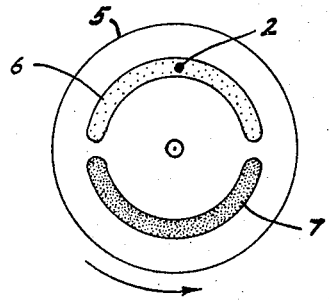
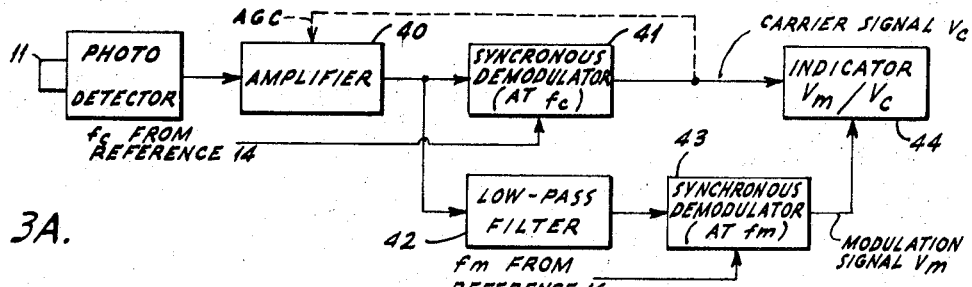
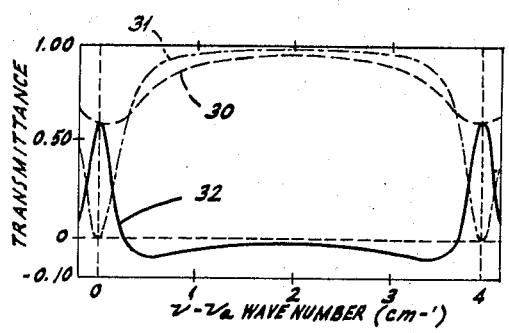
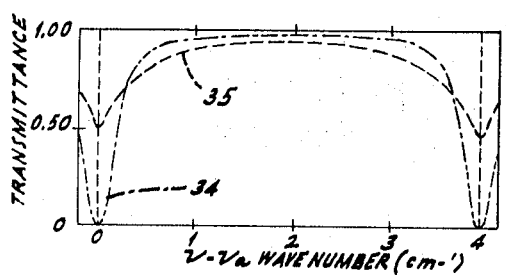

3,793,525

DUAL CELL NON-DISPERSIVE GAS ANALYZER

BACKGROUND OF THE INVENTION

Radiant energy transmission has long been used as a means for gas analysis. Because of the abundance of absorption bands in the infrared, radiant energy in the infrared is most often used. Typically, narrow band energy is selected so that emission occurs at a characteristic absorption band of the gas being measured. This can be done with a broadband source and selective filters, or a sample of the gas is excited by electrical means and the desired radiant line selected by filters. Alternately a spectrometer can be used as a nearly monochromatic source. The radiant energy is passed through the gas to be analyzed and the attenuation is noted. The quantity of gas can be related to the sample length and attenuation.

Since photoelectric measuring devices are often used in such instruments to detect the transmitted radiant energy and, since such devices usually have a noise spectrum that rises with decreasing frequency, most systems employ chopped radiation. For example, the transmission path is interrupted or the source modulated at a suitable rate. The photoelectric device output is amplified at the chopping frequency and synchronously demodulated to produce a d-c signal related to radiant energy intensity.

A commonly used refinement involves the use of two radiant energy channels with the chopper allowing input energy to alternately pass through each of the two channels. One channel contains a reference cell, filled with a non-attenuating sample gas and the other channel contains the unknown sample of the gas to be detected. In the absence of a radiation attenuating gas in the sample cell the two channels have equal transmission. When a radiation absorbing sample is present, the two channels no longer have equal transmission. The difference in transmission can be related to the quantity of absorbing gas. This two-beam system has the advantage over the single beam devices in that the two channels being quite similar, will be less affected by slight variations in source intensity and incidental variable transmission effects.

Such systems require a spectral filter or a monochromator to limit the response of the instrument to the desired spectral region. Furthermore, the measurement of a particular gas can be affected by other gas species to varying degrees. The radiant energy channels must be kept free of particulate matter that will indiscriminately attenuate. This latter requirement makes applications such as automative exhaust or smokestack monitoring quite complicated.

An instrument with several features similar to the invention involves a single selector cell containing the gas species to be measured. This cell and an attenuator are alternately inserted into the beam of radiant energy that passes through the sample region. The attenuator and the selector cell are made to have the same average transmittance over a spectral region determined by a band pass filter. The sensitivity depends on the correlation in the spectral features of the absorption by the gas species to be measured in the sample region and the gas in the selector cell. While the principle of detection is similar to that of the invention described below, the ability of this instrument to discriminate against absorption by other gases and particulates is inferior, in many cases, to that of this invention.

SUMMARY OF THE INVENTION

It is an object of our invention to provide a multichannel radiant energy gas analyzer wherein all paths traverse the sample being analyzed.

It is a further object to provide a gas analyzer system which avoids the use of narrow band radiant energy devices.

It is a still further object to provide a non-dispersive radiant energy gas analyzer employing two-frequency optical chopping to distinguish between changes in the total radiant power and changes due to the absorbing gas.

It is a still further object to provide a non-dispersive radiant energy gas analyzer employing two selector cells containing the gas species to be measured at more than one pressure value.

These and other objects are accomplished in a system configured as follows. A radiant source, capable of broad band emission over the wavelengths of interest, is located so as to emit energy through the sample to be measured. Before the radiant energy passes through the sample, it passes through either of two selector cells filled with the gas species to be measured. One of the selector cells is at low pressure and the other at high pressure. For the sake of discussion, the instrument is said to consist of two channels corresponding to the two selector cells. The signals in the two channels combined indicates the total transmitted energy. The differential transmission between the two channels is a function of the quantity of the gas to be measured in the sample region. In practice if the differential signal value is divided by total transmission, an indication is obtained that is directly related to the total quantity of the gas species to be measured in the sample region.

In the preferred embodiment the radiant energy emitted by the source is chopped at a relatively high frequency. The beam of radiant energy alternates from one channel to the other at a second lower frequency. The two channels contain a common band pass filter and photo detector combination. The detector output is amplified and demodulated. In operation the sample region is first evacuated or the gas to be measured is removed and the two radiant energy channels are balanced by appropriate adjustment of gas pressures in the two selector cells. Thus transmissions through the high and low pressure selector cells are equalized. This is indicated as a null in the low frequency signal produced by the photo detector. The gas to be measured is then admitted into the sample region and the quantity of this gas is indicated by the magnitude of the low frequency signal out of the photo detector.

Such a system shows improved performance in terms of lack of response to interfering gasses and particulate matter in the sample region. The radiant energy filter is only required to pass a band of energy containing absorption lines of the desired gas and its pass band is not critical. The detector need only be responsive to the radiant energy in the filter pass band. Thus none of the optical elements are highly critical.

BRIEF DESCRIPTION OF THE DRAWING

FIG. 1 is a block diagram of an optical gas analyzer employing the invention;

FIG. 2 shows, in plan view, other details of cell assembly 5 of FIG. 1;

FIG. 3 is a spectral transmission plot showing (A) high and low pressure cell transmission and the differential transmission, (B) the transmission of a typical sample, (C) the high and low pressure transmission each multiplied by the sample transmission; and FIG. 4 is a block diagram of an alternate electronic system.

DESCRIPTION OF THE PREFERRED EMBODIMENT

FIG. 1 shows the elements in the preferred embodiment of the invention. Radiant source 1 is an emitter of radiant energy in the wavelength interval of interest. In the 2 to 10 micron infrared wavelength region it has been found that source 1 can be simple, such as a piece of nichrome wire or a conventional ceramic-coated power resistor with sufficient current flowing to heat it to a dull red glow. If a greater quantity of energy is desired, a globar or Nernst glower type source may be employed. Other appropriate sources can be used depending on the wavelength interval of interest.

The energy from source 1 is chopped at a relatively high frequency by chopper 3, which may be a disk having a series of peripheral apertures. Motor 4 rotates chopper 3 at the desired rate. Typically chopper 3 will interrupt the optical beam about 720 times each second.

As shown in FIG. 1, the beam of radiant energy 2, from the source 1, is chopped by chopper 3 and passes through one of the two rotating selector cells 6 or 7 which are a part of a cell assembly 5 that is rotated by motor 8. Both chopper 3 and the cell assembly 5 may be rotated by a common motor. An end view of the rotating selector cell sub-assembly is shown in FIG. 2 with the relative position of the radiant energy beam 2 indicated. The portions containing gas are dotted in FIG. 2. Beyond the selector cells, the radiant energy traverses the sample region 9 (which will contain the gas to be analyzed, and possibly other gasses or particulate matter) and a spectral band-pass filter 10 and impinges a photodetector 11.

Sample region 9, which is shown in dashed outline, may be a confined volume inside a cell having transparent windows at input and output ends thereof and having means for controlled sample gas confinement and/or flow. Alternatively, sample region 9 may simply be a selected volume of space where a measurement is desired.

When the selector cells are in the position indicated in FIG. 1, the radiant energy passes through selector cell 6 which contains a quantity of the gas species to be measured at low pressure. Selector cell 7, which alternates with cell 6 as cell assembly 5 rotates, contains a quantity of the same gas species at high pressure. The quantities of gas in the two selector cells are adjusted so that the average attenuation over the spectral band pass of filter 10 is the same for both cells. If pure gas is used in the selector cells, the high pressure cell 7 is made shorter than the low pressure cell 6. The pressure in selector cell 7 can be increased without increasing the amount of the absorbing gas species to be measured by adding a non-absorbing gas such as $N_2$ or $O_2$. Thus, cells 6 and and 7 can be made in the same length, as indicated in FIGS. 1 and 2 to facilitate mechanical balancing of the cell assembly. The selector cells typically are alternated into and out of the beam at about 30 times a second, a frequency, $f_m$, much lower than the typical 720 Hz chopping frequency, $f_c$, of chopper 3.

Band pass filter 10 limits the transmitted beam to a spectral region of absorption by the gas species to be measured. The band pass is generally not critical but is chosen to optimize sensitivity and discrimination against other gas species that may be present in the sample.

The photodetector 11 should have sufficient detectivity in the spectral band passed by filter 10 to produce a good signal-to-noise ratio in the system. The sensitive element of the detector and its operating temperature are determined by the wavelength region and the required detectivity. For example, convenient, uncooled PbS detectors may be used for wavelengths shorter than approximately 3 micrometers. Uncooled PbSe can be used to somewhat longer wavelengths. The detectivity can be improved and the region of response can be extended for both of these detectors by cooling them. Relatively high detectivity can be achieved between 3 and 5 micrometers with a PbSe detector cooled thermo-electrically to approximately 31 30°C. If higher detectivity is required, an InSb detector operating at liquid nitrogen temperature (about −196°C) may be used. For wavelengths greater than approximately 5 micrometers, PbSnTe, Cu doped Ge, or Hg doped Ge may be used; the choice depends on wavelength, required detectivity, and convenience of cooling to the operating temperature.

The output of photo detector 11 is amplified by amplifier 12 which is usually tuned to reject the low frequency $f_m$ with which each selector cell enters the beam and to pass the high frequency chopper signal or carrier frequency $f_c$ and the side-band frequencies $f_c-f_m$ and $f_c+f_m$. Thus in its simplest form amplifier 12 is a band pass device tuned to the frequency $f_c$, of chopper 3 and of sufficient bandwidth to accommodate the frequency range spanned by twice the selector cell frequency $f_m$. Amplifier 12 may also have a gain control (not shown) and comprise two or more stages of amplification with one of the stages in a separate package near the photodetector 11. The output of amplifier 12 is fed into synchronous demodulator and low-pass filter 13. Reference pickup 14 senses, by magnetic, photoelectric, or other well-known means, the rotation of chopper 3 and produces an electrical signal at the exact chopping frequency, $f_c$, of chopper 3. This electrical signal serves as the reference for synchronous demodulator 13. After the amplified photodetector signal is demodulated, any remaining high-frequency ripple is smoothed by the low-pass filter (contained in device 13) that passes the modulation frequency $f_m$ and rejects the high carrier frequency $f_c$.

The smoothed output of demodulator and filter 13 includes a d-c component defined as $V_c$, and an a-c component defined as $f_m$ which is fed into amplifier and synchronous demodulator 15 which receives its synchronized reference signal at the frequency of $f_m$ from reference pickup 16. The output of amplifier and demodulator 15 is a d-c voltage, labeled $V_m$, that represents the unbalance between the channel containing selector cell 6 and the channel containing selector cell 7. $V_m$ constitutes the modulation of the carrier signal $V_c$.

Indicator 17 shows the ratio $V_m/V_c$ which constitutes a measure of the relative unbalance of radiant energy in the two channels. It is clear that for a given relative unbalance $V_m$ would vary with changes in source radiance, detector sensitivity, and transmittance of foreign matter such as particles on the windows of or inside the sample region. However, in the described arrangement, these changes also produce corresponding variations in $V_c$ with the result that the quantity $V_m/V_c$ is relatively unaffected. In one embodiment indicator 17 could have the two input signals applied to devices having logarithmic response characteristics. One output of one log device can be subtracted from the output of the other to obtain a quantity that is directly related to the quantity of gas being measured.

As an alternative to the above, as shown in FIG. 1 by the dashed line labeled AGC, the synchronous demodulator 13 can provide an automatic gain control (AGC) signal to vary the gain in amplifier 12 so as to provide a constant average $V_c$ output. The response time of the AGC circuit is made sufficiently long for the system to pass the modulation of $V_c$ at frequency $f_m$, but longer term fluctuations in $V_c$ are removed. For this condition the output $V_m$ of amplifier and synchronous demodulator 15 will be proportional to $V_m/V_c$ and the circuits associated with indicator 17 can be omitted.

FIG. 3 illustrates the spectral principal of operation of the analyzer. The graphs show spectral transmittance as a function of wavenumber for two adjacent absorption lines of a typical gas. The abscissa is in incremental wavenumber units with zero representing the center of one of the lines. In FIG. 3A the dashed line 30 represents the transmittance of the gas at high pressure as found in selector cell 7. The dashed line 31 is the low pressure gas transmittance encountered in selector cell 6. It will be observed that the low-pressure absorption lines are deeper showing more attenuation at the line centers and less attenuation between the lines. Absorption lines are narrower in the low pressure cell due to less collision broadening. The solid line 32 represents the difference between the dashed lines (line 31 subtracted from line 30) and corresponds to the spectral response of the system. The average value of line 32 can be made equal to zero by proper control of the selector cell absorption characteristics. In view of the further description of the method of operation below, it can be seen that absorption by any gas or particulate matter in the spectral region where line 32 is positive will produce the same effect as the gas to be measured. Absorption where line 32 is negative will produce the opposite effect; i.e., it will reduce the reading of the concentration of the gas to be measured. It could produce a negative reading if the concentration of the gas to be measured is low.

The device of FIG. 1 operates in the following manner. The average transmittances of the two optical channels corresponding to selector cells 6 and 7 are equalized for the condition where the gas to be measured is absent from sample region 9. The sample region, if feasible, is evacuated. Otherwise a sample region is employed that is free of at least the gas to be measured. Equalization is achieved by adjusting the pressure or path length in one of the selector cells. Alternatively an optical or electronic attenuator (not shown) could be introduced into the stronger of the two channels as a final trim adjustment. A balanced condition will be indicated when the electrical output shows the smallest ratio of modulation to carrier signal (the lowest or nulled modulation value $V_m$).

The solid line curve 33 of FIG. 3B represents the spectral transmittance as a function of wavenumber for the same two adjacent absorption lines of the gas present in sample region 9. This curve represents the gas to be measured in lesser total quantity than than in the low pressure selector cell 6.

FIG. 3C shows plots of sample transmittance multiplied by selector cell transmittance of both the high and low pressure selector cells. This is done because the optical paths include sequential or multiplied transmission values. Curve 35 is the sample transmission 33 multiplied by the high pressure transmission curve 30. The difference between curves 30 and 35 represents the influence of the sample on the transmission during the portion of each cycle when selector cell 7 is in the beam.

Curve 34 is the sample transmittance, curve 33, multiplied by the low pressure transmission curve 31. The difference between these two curves is too small to show in FIG. 3C and represents the influence of the sample on the transmission when selector cell 6 is in the beam. The inclusion of the sample has much less effect during this portion of the cycle than it has when the beam passes through selector cell 7. After the beam has passed through cell 6, little energy remains at wavenumbers where the sample absorbs; thus, the sample has little effect. On the other hand, after the beam has passed through cell 7, considerable energy remains at wavenumbers where the sample absorbs. Since the photo detector responds to the integral of the curves over the bandpass interval, it no longer receives balanced signals from the two optical paths and the modulation to carrier ratio as indicated at indicator 17 increases. Thus, the modulation to carrier ratio $V_m/V_c$ will be a function of the amount of gas in the sample region 9.

By relating the outputs of synchronous demodulators 13 and 15 as shown, the quantity of gas in sample cell 9 can be determined. If particulate matter is present in sample region 9 the transmission in both channels will be lower but this will not alter the $V_m/V_c$ ratio and will therefore not interfere. It is apparent that if the major absorption lines of an interfering gas present in sample region 9 are nearly coincident with the strong lines of the gas species to be measured, the interfering gas will cause the instrument to read too high. In this case there is said to be a positive correlation between the spectral structures of the two gas species. On the other hand, if the major lines of the interfering gas occur at wavelengths between the strong lines of the gas to be measured and are well away from them, the spectral structures are said to have a negative correlation and the interfering gas causes the instrument to read too low. If the spectral structure of the interfering gas is not correlated with that of the gas to be measured, the interfering gas will affect both channels equally and will not result in a change in the $V_m/V_c$ ratio. There is usually very little correlation between the absorption line structures of two different gas species over a spectral region containing several lines of one of the gases. Therefore, the discrimination of the instrument against other interfering gases is usually quite good.

FIG. 4 shows an alternate arrangement for the electronic portion of the analyzer. The signal from photo detector 11 is amplified by a wide-band amplifier 40. The amplified signal is fed into synchronous demodulator 41 which receives its reference signal at the carrier frequency $f_c$ from reference pick-up 14 (see FIG. 1). The amplified signal from amplifier 40 is also fed into a low-pass filter 42 that passes the modulation frequency $f_m$ and rejects the carrier frequency $f_c$. The output of filter 42 serves as the input for synchronous demodulator 43 whose output $V_m$ is the modulation signal. Indicator 44 indicates the ratio $V_m/V_c$ as in the arrangement illustrated in FIG. 1. As in the arrangement described previously, the ratio circuitry of indicator 44 can be omitted if an automatic gain control circuit (as shown by the dotted line) is used to maintain the average $V_c$ constant so that $V_m/V_c$ is proportional to $V_m$. It is noted that in the electronic system illustrated by FIG. 4, the high frequency ($f_c$) signal does not serve as the carrier for the modulation frequency.

When either of the circuits shown in FIGS. 1 or 4 are used, the system is insensitive to radiant energy emitted by the sample region 9 or by any other components between the selector cell assembly 5 and the photo detector 11. If the modulation signal $V_m$ is carried by a carrier signal as indicated by the circuit in FIG. 1, the system is also insensitive to energy emitted by the selector cell assembly since it is not chopped at frequency $f_c$. This factor may be important, particularly for stability, if the selector cells are not at exactly the same temperature as other components. If the sample region 9 is a long atmospheric path or the plume from a smokestack, there may be advantages in having the selector cells 6 and 7 located between the sample region and the photodetector. Such an optical arrangement is insensitive to emission by the sample region if the carrier system of electronics (FIG. 1) is used.

The circuits of FIG. 1 are usually preferred over those of FIG. 4 when the noise of photodetector 11 is less at the high chopping frequency than at the lower modulation frequency. If the chopping must be limited to relatively low frequencies, or if the detector noise is not significantly greater at low frequencies, the circuits of FIG. 4 may be preferred. When the circuits of FIG. 4 are employed the opaque portion of the chopper 3 may be made less than the open portion in order to increase the radiant energy available for modulation by the selector cells. This increases $V_m$ at the expense of a decrease in which the high frequency signal $V_c$. However, the detectivity and accuracy of the system are usually limited by noise on the smaller signal $V_m$ so that the decrease in $V_c$ does not decrease the performance. When the carrier system (FIG. 1) is employed, maximum $V_m$ is obtained when the open to closed ratio of chopper 3 is unity.

The following table constitutes a list of some gases that can be evaluated along with the spectral region selected to give good results.

TABLE I

| Gas to be Measured | Preferred Spectral Region (microns) |
| --- | --- |
| Carbon Monoxide CO | 4.7 and 2.3 |
| Nitric Oxide NO | 5.3 |
| Sulphur Dioxide $SO_2$ | 7.4, 8.7, and 4 |
| Sulphur Trioxide $SO_3$ | 3.6, 7.2, 18.8, and 20 |
| Hydrogen Fluoride HF | 2.4 |
| Hydrogen Chloride HCl | 3.5 |
| Methane and other hydrocarbons $CH_4$ | 3.1 – 3.5 |
| Nitrogen Dioxide $NO_2$ | Visible and Ultraviolet |

EXAMPLE 1

The system of FIG. 1 but using the electronics of FIG. 4 was employed for detecting CO. Selector cell 7 having a 0.23 cm transmission path length was filled to 6 atmospheres with a mixture of 8% CO and 92% $N_2$. Selector cell 6 had a 1.5 cm long path length and contained 0.18 atmosphere of pure CO. Filter 10 passed a radiant energy band of about 4.45 to 4.80 microns. Sample region 9 was made 125 cm long. CO concentrations as low as 0.8 ppm in air at 1 atmosphere could easily be detected. Discrimination against $CO_2$ and $H_2O$ was very good.

EXAMPLE 2

A setup similar to that in Example 1 was used with the filter bandpass narrowed to 0.06 micron and its center carefully adjusted to an optimum position near 4.6 microns. This system produced a $CO_2$ discrimination ratio greater than $2 \times 10^5$. This means that one part of CO in the sample region produced more signal than $2 \times 10^5$ parts of $CO_2$. This ratio is approximately 10 times as great as that achieved in Example 1 without any special care in adjusting the bandpass.

While a particular system and two electrical embodiments have been shown, a person skilled in the art will recognize that many alternatives within the spirit of the invention are available. For example, the rotating selector cells can be replaced by stationary cells and system of mirrors used to alternately direct the beam through one selector cell then the other. A simpler system directs different beams through each of the selector cells with the two beams brought together to a common detector. This latter system suffers certain drawbacks because the two optical paths corresponding to the two selector cells pass through different portions of the sample region and non-uniformities in the sample region can produce long-term drift and noise. Filter 10 could be located adjacent to the source. Chopper 3 could be located next to photodetector 11 (provided that sample region emission is not a problem) or anywhere in the system where it acts on both selector cell channels equally. Furthermore chopper 3 and selector cell assembly 5 could be built into a unitary structure and run by a single motor. Other means of processing the signal from the photodetector can also be used in order to obtain a quantity related to $V_m/V_c$. Synchronous demodulators generally provide optimum signal-to-noise ratios but may not be required for many applications. It is intended that the scope of the invention be limited only by the following claims.

We claim:

1. A radiant energy gas analyzer comprising:
   a source of radiant energy,
   means for modulating said radiant energy at a first frequency,
   means for passing said radiant energy through a region containing a gas to be analyzed,
   means for filtering said radiant energy to confine the transmitted radiant energy to a portion of the spectrum where said gas to be analyzed displays absorption lines,
   means for switching said radiant energy between two channels at a second frequency,
   means in a first channel for passing radiant energy through a first selector cell adapted to contain a quantity of said gas to be analyzed at a first pressure, means in a second channel for passing radiant energy through a second selector cell adapted to contain a quantity of said gas to be analyzed at a second pressure higher than said first pressure, means for adjusting the radiant energy in said two channels to obtain equal average transmission in the absence of said gas to be analyzed in said region, means for converting the radiant energy in said two channels to electrical energy, and means for analyzing said electrical energy to provide an indication of the ratio of signal at said second frequency to signal at said first frequency, said ratio being proportional to the quantity of said gas to be analyzed in said sample region.

2. The apparatus of claim 1 wherein said second frequency is substantially lower than said first frequency.

3. The apparatus of claim 1 wherein said means for converting said radiant energy to electrical energy is a photodetector feeding an electronic circuit comprising:

a broadband amplifier, and
synchronous demodulators operating at said first and second frequencies.

4. The apparatus of claim 1 wherein said means for converting said radiant energy to electrical energy is a photodetector feeding an electronic circuit comprising:

a bandpass amplifier tuned to said first frequency,
a demodulator connected to said bandpass amplifier,
means connected to said demodulator to produce a d-c signal related to said second frequency, and
means connected to said demodulator to produce a d-c signal related to said first frequency.

5. In a dual channel analyzer of a particular gas in a sample, said analyzer including a radiant energy source and a single radiant energy detector, the improvement comprising:

a. means for confining the energy of said source to a predetermined spectral range, b. means for passing said energy through a sample region that may contain a quantity of said gas, c. means for applying said energy alternately to two channels at a first frequency, d. means for passing the energy in one of said two channels through a selector cell adapted to contain a quantity of said gas at a first pressure, e. means for passing the energy in the other of said two channels through a selector cell adapted to contain a quantity of said gas at a second, lower pressure, f. means for equalizing the average transmittance of said two channels in the absence of said gas in said sample region, g. means for modulating said source at a second frequency, said second frequency being higher than said first frequency, and h. electrical circuit means connected to said detector for indicating the ratio of the amplitude of said first frequency signal component to the amplitude of said second frequency signal component, said ratio being proportional to said quantity of said gas in said sample region.

* * * * *

PO-1050
(5/69)

UNITED STATES PATENT OFFICE
CERTIFICATE OF CORRECTION

Patent No. 3,793,525    Dated February 19, 1974

Inventor(s) Darrell E. Burch, David A. Gryvnak, and John D. Pembrook

It is certified that error appears in the above-identified patent and that said Letters Patent are hereby corrected as shown below:

Column 4, line 22, change "31" to -- - --(a minus sign).

Signed and sealed this 11th day of June 1974.

(SEAL)
Attest:

EDWARD M. FLETCHER, JR.
Attesting Officer

C. MARSHALL DANN
Commissioner of Patents